United States Patent Office 3,093,544
Patented June 11, 1963

3,093,544
METHOD OF RELIEVING PAIN EMPLOYING 1,3,5-TRIHYDROXY-BENZENE
Louis Lafon, 86 Ave. de la Republique, Paris, France
No Drawing. Filed Dec. 22, 1961, Ser. No. 161,397
Claims priority, application Great Britain Dec. 30, 1959
7 Claims. (Cl. 167—65)

Phloroglucinol (1,3,5-trihydroxy-benzene) is a solid in the form of rhombohedric prisms, the crystals of which include two molecules of water of crystallisation. The hydrated material melts at 117° C. and, if anhydrous, it melts around 218° C. under rapid heating and between 200° and 209° C. under gentle heating; this substance is soluble in water and slightly soluble in alcohol and ether.

The applicant has discovered that phloroglucinol has very interesting antispasmodic properties, and pain relieving properties in the management of nephritic and hepatic colics.

Numerous pharmacological tests have been carried out in order to verify that phloroglucinol can be used safely and with high activity in therapeutics.

In the first place, acute toxicity tests have been carried out. Acute toxicity has been determined intraperitoneally on white mice. 44 female mice of the Webster strain have been tested, having a weight between 16 and 25 g. Toxicity has been studied for dosages from 0.25 to 2 g. per kg.; even at this latter dosage, no immediate mortality has been observed. However, two mice out of twelve died after 23 hours.

Even at this dosage of 2 g. per kg., no respiratory, cardiac or convulsive toxic phenomenon was noted after the injection. Merely a certain transient stimulation of the animal with running movements was observed.

In all cases, an abdominal contraction syndrome with elongation of the hindquarters was noted, which phenomenon persisted for 5 to 10 mins.

Intravenous toxicity tests have also been carried out on dogs anaesthetised with chloral, by injecting doses varying from 25 to 250 mg. per kg.; even at this latter dosage, which was injected into 8 dogs, no mortality was observed.

Study of the chronic toxicity of phloroglucinol has shown that, in doses markedly greater than active doses, the product is entirely without any risk; the growth of rats absorbing the product mixed in concentrations of 0.15–0.62% with their food was not reduced in comparison with control rats. Hematological examination allowed no anomalies to be observed. Examination of the vital organs and the weights showed no detectable difference in comparison with the controls; in particular, there was no antithyroid action at these doses.

Females were mated with males; the fertility and fecundity of animals to which phloroglucinol was administered were not substantially different from those of control animals.

First generation animals had absorbed the product during 200 days and those of the second generation during 60 days; no toxic or subtoxic phenomena were observed.

The antispasmodic effect of phloroglucinol was then studied. For this, in a first series of experiments, female rats having a weight ranging between 75 and 200 g. were used, which were previously unfed for 20 hours. The duodena of these rats were taken and maintained alive in a standard Tyrode solution prepared by means of double distilled water oxygenated by aeration; the organs being maintained at a constant temperature of +32° C.

29 rats were used in these experiments and each test was made on two organs or these animals.

Phloroglucinol was used in 1% solution and in 5% saturated solution and added to Tyrode liquid so as to have a total volume of 80 ccs. in each test tube.

For the dosage, the peristaltic movements were recorded when, after 15 to 20 minutes' immersion in the Tyrode solution, the duodenum was relaxed and about 10 mg. of barium chloride had been introduced into the bath. The preparation was washed, immediately after observing a muscle contraction and a state of persistent spasm, by means of a Tyrode solution. After 15 mins., the experiment was repeated; if an identical response was obtained, the preparation was washed immediately. The same quantity of barium chloride was then added to the Tyrode liquid containing the duodenum and, without effecting washing, 0.05 g., 0.10 g. and 0.15 g. of phloroglucinol per 80 ccs. was added.

In each case, an antispasmodic effect was obtained which was the greater as the dose of phloroglucinol was larger. The effect increased with the concentration.

On average, the dose of 50 mg. for 80 ccs. of Tyrode exerted an antispasmodic action of 42%, the 100 mg. dose an action of 70% and the 150 ml. dose an action of 81%.

It was thus shown that phloroglucinol exerts a preventive effect on the spasmogenic action of barium chloride on isolated rat duodena.

Phloroglucinol has the property of alleviating the spasm of muscular origin produced by barium chloride on the duodenum of the rat. The effect of phloroglucinol is reversible by washing, also. After producing a moderate spasm by means of barium chloride and then alleviating the spasm with phloroglucinol, the muscle can be restored to its initial condition by repeated washing and prolonged rest.

The antispasmodic effect of phloroglucinol has also been studied on the duodenum and ileum of the dog in situ. This action was studied on the intestinal spasm produced by barium chloride in the dog subjected to artificial respiration; the experiment was made on dogs anaesthetised with chloralose.

In all cases, 200 mg. of phloroglucinol per kg., injected intravenously, were sufficient to alleviate the spasm produced by 3 mg. of barium chloride per kg. Slowing of the peristaltic contractions was also observed.

Study of the antispasmodic action of phloroglucinol has also been made on isolated dog and guinea-pig ureters. It has been established that, on these isolated organs, phloroglucinol does not modify the effect of acetylcholine, although it is alleviated by atropine; phloroglucinol alleviates the spasm produced by barium chloride and is capable of preventing the spasmogenic effect of barium chloride on the isolated ureter.

This product thus exerts on the isolated ureter an effect analogous to that observed on a smooth muscle such as an isolated rat duodenum.

An attempt was also made to establish the pharmacodynamic spectrum of phloroglucinol.

The cardio-vascular effect was studied upon dogs normotensively anesthetised with chloral.

The carotid pressure of several dogs was recorded and it was observed that injection of 25 to 75 mg. per kg. of phloroglucinol caused no change in this pressure.

On the contrary, with all the animals, injection of 200 to 250 mg. per kg. of phloroglucinol caused a diminution in the carotid pressure which varied according to the animals from 20 to 60%.

The coronary vasodilator effect was studied by the classical technique of Langendorff, on isolated rabbit heart. For this purpose, an isolated rabbit heart was suffused using an oxygenated Van Dyke Hastings solution. After having established the output of suffusion of the base, a dilute solution of phloroglucinol was injected into the tube connecting the suffusing device to the nozzle. This experiment was carried out on several rabbits; doses from 0.1 to 10 mg. of phloroglucinol were without effect. Doses of 50 to 100 mg. of phloroglucinol caused vasodilation ranging between 10 and 200%.

Clinitical tests have also been carried out, at the Hôpital Bichat in Paris, patients being given cachets containing phloroglucinol in different doses and cachets solely containing glucose.

With twenty patients, it was observed that phloroglucinol, employed in the form of cachets containing one part of phloroglucinol to nine parts of glucose, had a certain efficacy as an antispasmodic and were tolerated perfectly.

On another twenty patients suffering from hepatitis, phloroglucinol inhibited, in almost every case, the pain caused by the influence of sodium dehydrocholate and morphine hydrochloride.

1 to 3 cachets per day containing 10 mg. of phloroglucinol and 90 mg. of glucose, in the case of calcified cholecystitis and hepatitis, diminished and often even eliminated the depression.

On the other hand, twelve patients had their nephritic crises calmed by the administration, during the period of depression, of two cachets containing 5 mg. of phloroglucinol.

It was observed that phloroglucinol exerted a certain effect in each case, even in a dose of $\frac{1}{10}$ mg., use in the form of cachets, capsules, powders or tablets giving equally good results.

Other clinical tests carried out at the Hôpital Saint Louis in Paris have shown that phloroglucinol has a spectacular action in the treatment of nephritic colic, the product being associated with a reducing sugar such as glucose, fructose or levulose in doses of 5 to 40 mg. per unit (cachet or tablet).

The present invention accordingly consists in a pharmaceutical composition suitable for use as an antispasmodic, which comprises phloroglucinol and one or more inert or active substances in admixture therewith. The other substance or substances may be solid or liquid, such as a solvent, dispersant or other carrier for the phloroglucinol and the composition may be made in the form of a cachet, capsule or other dosage unit as described above.

This application is a continuation-in-part of my application Serial No. 75,682, filed December 14, 1960, and now abandoned.

I claim:

1. The method of relieving pain in the management of hepatic and nephritic colic which comprises administering to patients suffering such colic an amount of phloroglucinol sufficient to combat the colic.

2. The method of claim 1 in which the phloroglucinol is administered in a daily amount of 1 to 50 milligrams.

3. The method of claim 1 in which the phloroglucinol is administered in a daily amount of 1 to 50 milligrams combined with a reducing sugar in an amount ranging from 5 to 40 milligrams per unit dose.

4. The method of claim 1 in which the phloroglucinol is administered in a daily amount of 1 to 50 milligrams combined with a reducing sugar selected from the group consisting of glucose, fructose and levulose in an amount ranging from 5 to 40 milligrams per unit dose.

5. The method of claim 1 in which the phloroglucinol is administered in a daily amount of 1 to 50 milligrams combined with a reducing sugar selected from the group consisting of glucose, fructose and levulose in an amount ranging from 5 to 40 milligrams per unit dose, together with a carrier for said phloroglucinol.

6. The method of claim 5 in which the carrier is a phloroglucinol solvent.

7. The method of claim 5 in which the carrier is a dispersant for the phloroglucinol.

References Cited in the file of this patent

Oettingen: Phenol and Its Derivatives, National Institutes of Health Bulletin No. 190, U.S. Government Printing Office, Washington, D.C., 1949, pp. 187–188.